United States Patent [19]
Baldwin

[11] 3,887,331
[45] June 3, 1975

[54] METHOD FOR EVALUATING PETROLEUM RESERVOIRS

[75] Inventor: Bernard A. Baldwin, Bartlesville, Okla.

[73] Assignee: Phillips Petroleum Company, Bartlesville, Okla.

[22] Filed: May 13, 1971

[21] Appl. No.: 143,214

[52] U.S. Cl. .............................. 23/230 EP; 208/8
[51] Int. Cl. ....................... C10g 1/04; G01n 33/24
[58] Field of Search ..................... 23/230 EP; 208/8

[56] References Cited
UNITED STATES PATENTS

| | | | |
|---|---|---|---|
| 2,617,719 | 11/1952 | Stewart.................................. | 23/312 |
| 2,889,884 | 6/1959 | Henderson et al.............. | 166/305 R |
| 3,254,959 | 6/1966 | Fallgatter et al................ | 23/230 EP |
| 3,300,641 | 1/1967 | Heinze................................. | 250/71 |

FOREIGN PATENTS OR APPLICATIONS 301,946  12/1928  United Kingdom..................... 208/8

OTHER PUBLICATIONS

Chem. Abstr. 41, 2269i (1947), Anon.

Chem. Abstr. 42, 4603c (1948), Guinot et al.

Primary Examiner—Robert M. Reese

[57] ABSTRACT

A core sample from a petroleum reservoir is subjected to seriatim elution with solvents of successively greater solvent strength and the composition of the organic material extracted with each solvent is separately identified. In a preferred embodiment heptane, benzene, and 2-methyltetrahydrofuran are used in succession as solvents. The amount of organic material dissolved in the weak solvent represents flowable oil, while the more tenaciously held organic material reveals the microscopic character of the reservoir.

5 Claims, No Drawings

1

METHOD FOR EVALUATING PETROLEUM RESERVOIRS

BACKGROUND OF INVENTION

This invention relates to the evaluation of petroleum reservoirs. In one of its aspects, it relates to the determination of microscopic characteristics and wettability of a petroleum reservoir. In another of its aspects, it relates to a determination of which organic materials are most tenaciously retained by a reservoir core sample. In still another of its aspects, the invention relates to elution of organic materials from a petroleum reservoir core sample. In another of its aspects, it relates to the solubility of petroleum reservoir core sample material in various solvents.

In one concept of the invention it relates to evaluation of a petroleum reservoir by determination and identification of the organic material in a reservoir core sample that is most tenaciously retained by the core sample. In another of its concepts it relates to employing successive treatment with solvents of relatively increased strength to remove organic compounds from petroleum reservoir core samples.

Many investigations have firmly established the importance of the oil-reservoir system to oil recovery in what can be described as a macroscopic approach to reservoir evaluation. It is surprising that very few investigations have attempted to determine the microscopic nature of the reservoir-oil interactions. In the field of improved oil recovery the area of adsorbed molecules on reservoir surfaces has been virtually neglected. Although, intuitively, many people have felt that the larger or more polar molecules would either settle out or be preferentially adsorbed on the reservoir rocks, no known attempts have been made prior to the experimentation leading to the present disclosure to prove or disprove these intuitions.

In the design of secondary oil recovery methods, as for example those using surfactants, something should be known about the reservoir surface and the fluid-surface interactions. Surface active agents which would remove all the oil from the rock's surface may be quite different from those which would effectively remove all but the most tightly adsorbed molecule. It is possible that removal of these last few layers of tightly adsorbed molecules may be undesirable, especially if they contain nitrogen or sulfur compounds which could effect the refining operations. Therefore a method to define the "surface of interest" for the development of improved secondary oil recovery methods is of great value.

Before an investigation of the effect of various perturbations, such as heat, pressure, surfactant, etc., on the material adsorbed on reservoir-like surfaces can be made for secondary oil recovery, it is necessary to know what molecular species or classes are most strongly adsorbed.

Therefore, it is an object of this invention to provide a method for evaluating petroleum reservoirs as to which molecular species of organic matter are most tenaciously retained by the reservoir. It is another object of this invention to provide a method for identifying the "surface of interest" in a petroleum reservoir, which for the purposes to this disclosure is defined as the surface from which oily material is removed in a secondary oil recovery process. It is still another object of this invention to provide a method for eluting organic material from a petroleum reservoir core sample.

Other aspects, concepts and objects of the invention are apparent from a study of this disclosure and the appended claims.

STATEMENT OF THE INVENTION

According to the present invention there is provided a method for evaluating a core sample for oil recovery which comprises (a) determining the relative amounts of recoverable organic material retained within the core sample at various degrees of tenacity and (b) identifying the components of said relative amounts of recoverable organic material to determine the surface of interest for recovery of oils.

In one embodiment of the invention the recoverable organic material retained within the core sample at various degrees of tenacity is determined by seriatim elution of the organic material from the core sample with solvents of successively greater solvent strength. In a preferred embodiment of this invention the elution of organic material from the core samples is carried out using a Soxhlet extractor.

The solvents used for the selective elution of recoverable organic material from core samples by the technique of this invention can be any of the well known solvents in which organic material is soluble. In the preferred embodiment of this invention three solvents are used, but four or more solvents can also be used. In the preferred embodiment the solvents are passed through activated silica gel and distilled before use. The criterion for purity is that no residue is left after room temperature evaporation. The "weakest" solvent can be one of several paraffins such as heptane, hexane, 2-methyl heptane or any other normal and branched $C_4$ to $C_{20}$ alkane selective for certain petroleum or hydrocarbon types. The intermediate solvent can be an aromatic such as benzene, xylene, toluene, trimethyl benzene or any other alkyl substituted benzene selective for another hydrocarbon type. The strongest solvent can be a heterocyclic such as 2-methyl tetrahydrofuran, dioxane, tetrahydrofuran or pyridine selective for still another hydrocarbon type. In the presently preferred embodiment heptane is the "weak" solvent, benzene is the intermediate solvent and 2-methyltetrahydrofuran (2-MTHF) is the strongest solvent.

Methods for contacting the solvents and the core samples can vary with the condition of the core sample. In general, if the core is consolidated, it is best not to crush the sample which would expose new surfaces thus changing the characteristics of the reservoir sample. A consolidated sample is best treated by subjecting it to treatment in a Soxhlet extractor, in which the solvent is recycled through a distillation process. Extraction and distillation with a relatively small amount of solvent continues until the amount of extracted material collected from the distillation becomes negligible. This process leaves the core samples intact.

If the core sample is unconsolidated, the sample can be loosely packed into a buret and the eluting solvent flowed over the sample until the material collected in the bottom of the buret is visually clear.

Although means such as distillation can be used to separate the solvent and eluted oils the solvents can also be removed from the eluted oils by evaporating at room temperature under a vacuum. This low temperature evaporation is used to minimize reactions of the eluted oil fractions. The relative amounts of oil eluted by each solvent is determined and the eluted oils are then submitted to various analytical tests to determine the composition of the eluted material. The analytical tests can be those that characterize the functional groups and broadly identify the classes of compounds in each eluted fraction. As can be seen in the following example, various methods of analysis can be employed depending on the accuracy of identification and degree of corroboration of data desired.

The following examples are meant to be illustrative and not exclusive.

EXAMPLE I

The test material of crushed petroleum reservoir core was separated by flotation to obtain a test material with a wettability index similar to the original test core. The unconsolidated core material was loosely packed into a buret and the eluting solvent flowed through the material. The solvent and eluted oils were collected at the bottom of the buret. Each solvent was allowed to flow well past the point at which it became visually clear. The core material was contacted sequentially with each of the three solvents, using heptane first, then benzene, and finally 2-MTHF.

EXAMPLE II

A consolidated core sample was obtained over which it was not practical to flow solvent in a buret. The core sample was placed in a Soxhlet extractor and contacted with each of three solvents, using heptane first, then benzene, and finally 2-MTHF.

EXAMPLE III Cobb

The material collected from each of the solvent extractions of Example I was separated from the solvent by evaporating at room temperature under a vacuum. The eluted oils were then submitted to various analytical tests including mass spectrometer analysis and infrared analysis to identify the components of the recovered organic material. Below are presented data obtained in this typical application of the method of this invention and the conclusions drawn from this data.

Some of the measured and observed properties of the eluted oils are given in Table I. It is apparent that the majority of the oil is not tightly bound to the surface of the core material, since 90 percent of it is removed by heptane, the "weakest" solvent. Over 6 percent of the oil was adsorbed to the core surface so strongly that it required a strong solvent, 2-MTHF, to remove it. Assuming average molecular weights (from the mass spectral data), average cross-sectional areas, and the surface area of the test core, the benzene eluted oil and the 2-MTHF eluted fraction represent, on the average, two and four molecular layers, respectively. This amounts to 175 barrels of oil per acre-foot not removed from the reservoir by a heptane solvent extraction.

The decreasing percentages of carbon and hydrogen indicate that the material eluted by the stronger solvents contains a higher percentage of other elements, probably oxygen and sulfur, etc., than does the heptane fraction. There was, in general, insufficient material available for elemental analyses for oxygen and sulfur. Analyses for several other elements did not show any significant difference with the exception of chlorine. The higher concentration of chlorine in the heptane eluted oil is probably due to residual brine which is dissolved or dispersed in the oil.

There were notable differences in the physical appearances of the eluted oils. It will be shown later that these changes in physical appearance are consistent with the other analyses of the eluted oils.

TABLE I

| | Physical Properties of Eluted Oils | | |
|---|---|---|---|
| | Heptane Elutant | Benzene Elutant | 2-MTHF Elutant |
| Fraction of original core weight | 4.8% | 0.2% | 0.35% |
| Fraction of total oil removed | 90% | 3.3% | 6.5% |
| Weight Fractions: | | | |
| Carbon | 83% | 78% | 65% |
| Hydrogen | 13.5% | 9% | 6% |
| Nitrogen | 0.03% | 1% | 0.45% |
| Sulfur | 0.24% | Insufficient Sample | Insufficient Sample |
| Silicon | 4 ppm | 1 ppm | 2 ppm |
| Aluminum | <10 ppm | <10 ppm | <10 ppm |
| Chlorine | 7 ppm | < 3 ppm | < 3 ppm |
| Physical Appearance | Yellow-Brown Liquid | Brown, Very Viscous Fluid | Dark Brown Nearly Glass |

Since the heptane eluted fraction is not tightly bound to the core surface it might be expected to be similar to the produced crude from the same reservoir. A comparison between the heptane elutant and the test reservoir crude is given in Table II. The effects of sample preparation, i.e., the evaporation of the solvent under vacuum at room temperature, were investigated by subjecting a sample of the crude to a vacuum in a similar manner to that used in evaporating the heptane fraction. It can be seen that the heptane fraction and the test reservoir crude are very similar, especially when both samples have been treated similarly, i.e., under vacuum. The difference in the C:H percentages may be due to slight oxidation of the oil on the core material.

TABLE II

| | Comparison of Test Crude and the Heptane Eluted Fraction | | |
|---|---|---|---|
| | Test Crude | Heptane Eluted Fraction | Treated Crude* |
| Specific Gravity | 0.839 g/ml | 0.877 g/ml | 0.872 g/ml |
| Viscosity at 100°F. | 42.5 cs | 72.7 cs | 85.1 cs |

TABLE II—Continued

Comparison of Test Crude and the Heptane Eluted Fraction

| | Test Crude | Heptane Eluted Fraction | Treated Crude* |
|---|---|---|---|
| Molecular Weight (Average) | 330 | 368 | 310 |
| Carbon:Hydrogen: Nitrogen | 86:14:0.12 | 83:13:0.03 | 86:13:0.06 |

*Maintained under vacuum for two weeks

It was pointed out earlier that the percentage of carbon and hydrogen in the eluted oils decreased with solvent strength, indicating an increase in the weight fraction of other elements. By comparing the relative amounts of carbon and hydrogen it is possible to gain some insight into the structure of the various eluted species. The carbon to hydrogen ratios for the eluted fractions as well as those for several hydrocarbon series are given in Table III. The increase in the amount of carbon relative to hydrogen indicates that the more tightly bound species are probably saturated and/or aromatic ring compounds and highly substituted materials. The carbon:hydrogen ratios are an average of all species in the eluted oils and cannot be used for identification of individual compounds or species.

TABLE III

Carbon:Hydrogen Ratios

| Material | Relative Carbon:Hydrogen |
|---|---|
| Heptane Eluted Fraction | 6.2:1 |
| Benzene Eluted Fraction | 8.7:1 |
| 2-MTHF Eluted Fraction | 10.5:1 |
| n-Alkanes | 5:1$^a$ – 6:1 |
| Saturated Ring Compounds | 6:1$^b$ – 12:1 |
| Aromatics | 12:1$^c$ – 24:1 |

$^a$ — Pentane
$^b$ — Cyclohexane
$^c$ — Benzene

Three eluted oils were submitted to direct inlet probe mass spectrometry. This technique was necessary because of the low vapor pressure of the benzene and 2-MTHF fractions. Standard sample introduction techniques result in quite erroneous results since it is possible for only fragments (about 10 percent) of the initial 2-MTHF elutant reach the mass spectrometer.

The mass spectra of all three eluted oils were very broad and indicated molecules present at every mass number above 70, ranging up to approximately 600. Such spectra are consistent with a large variety of molecular species present in the samples. This large variety restricts some of the possible interpretations. There is a 14 mass number repetition corresponding to a $-CH_2-$ unit. This repetition indicates that the molecules involved contain methylene chains which is consistent with infrared results. Any mass number can be produced by several different molecules, of course, but in the heptane elutant this methylene repetition was very evident. The benzene fraction showed this repetition but it was not as strong. The 14 mass number cycle was barely indicated in one or two regions of the 2-MTHF spectrum. The trend in these results is consistent with the trends seen in the infrared results.

Another of the mass spectral features is the position of the maximum intensity. This position moves toward higher mass numbers with an increase in solvent strength. However, the magnitude of different masses must not be confused with the concentration of that mass in the original elutant. The higher masses tend to have lower volatility and the ionization in the source stage of the mass spectrometer tends to produce lighter molecules by dissociation. In spite of these restrictions this mass data indicates that the molecules most strongly held to the reservoir surface are, on the average, larger than those molecules which are easily removed.

The model developed of this test core material system consists of an inorganic substrate to which the very strongly held layers are attached. These molecular species are large in size and contain aromatic and heterocyclic groups. The nature of the bonding of these molecules to the surface may range from a few specific strong bonds per molecule to a large number of weak bonds per molecule. The polar and aromatic nature of these molecules also leads to the possibility of interaction with layers further away from the surface. The benzene eluted fractions or less strongly held molecules are very aromatic in nature and contain less heterocyclics than the strongest held species. Two types of interaction can be responsible for holding these molecules. First, there is the interaction between the strongest held layers and the benzene elutant due to possible charge transfer complex formation and electron attraction. Second, the surface interaction or attraction could extend over several molecular distances which would provide some degree of physical adsorption. Calculations from surface area, the amount of oil removed, and estimated molecular weights and areas predict that, statistically, the strongly held layer is four molecules thick and the benzene elutant consists of two molecular layers. Due to the large surface area in the reservoir this constitutes considerable oil—as much as 175 barrels of oil per acre-foot in the tested reservoir. The weakly held layer now consists of the remainder of the oil. The largest portion of this tends to be of a saturated chain and ring composition with a lesser amount of the smaller aromatics present. This oil will show a considerable variation in attraction to the surface. Some of the molecules nearest the surface will show a restriction in mobility while those furthest from the surface may exhibit no interaction with the surface at all.

In the reservoir the weakly held molecules will be the easiest to remove, hence these will be produced by primary and most secondary recovery methods. The more strongly held layers will remain in the reservoir. Thus, for the reservoir tested, the surface of interest in planning secondary recovery methods and techniques will be that of adsorbed oil layers rather than a "clean" inorganic surface. It is probable that these strongly held layers also determine the wettability of the reservoir, both in production history and laboratory measurements. It should be pointed out that total recovery of all the oil may not be desirable since the strongly held species, the heterocyclics, etc., may be detrimental to some of the refining processes.

Although this proposed model of a reservoir system is based upon a "layered" structure of molecular species, it is obvious, of course, that there is not a well defined boundary between these "layers." An elution scheme using different solvents, or possibly a different number of solvents, etc., would lead to different "layers" of adsorbed species. The important feature of our model is a system consisting of an inorganic substrate upon which relatively large heterocyclic molecules are adsorbed, giving for practical purposes, a "surface of interest" with quite different properties than the bare inorganic surface. Upon this heterocyclic molecular surface other molecules are adsorbed with decreasing strengths as the distance from the reservoir inorganic substrate increases until the "large mass" of the oil in the centers of the pore structures may show very little or no attraction to the surface of the pore.

Reasonable variation and modification are possible within the scope of the foregoing disclosure and the appended claims of the invention the essence of which is that there has been provided a method for evaluating petroleum reservoirs which discloses the microscopic character of the reservoir.

I claim:

1. A method for evaluating a core sample to determine the fluid-surface interactions of recoverable organic material retained within the core sample which method comprises determining relative amounts of the different types of recoverable organic material retained within the core sample at various degrees of tenacity by (a) seriatim elution of said organic material from the core sample with solvents of successively greater solvent strength and (b) characterization of the functional groups and classes of compounds in each eluted fraction thereby determining the surface of interest for recovery of oil.

2. The method of claim 1 wherein elution is carried out using a Soxhlet extractor.

3. The method of claim 1 wherein the seriatim elution is carried out in three stages with the first solvent being a paraffinic material selective for certain petroleum or hydrocarbon types, the second an aromatic material selective for another hydrocarbon type, and the last a heterocyclic material selective for still another hydrocarbon type.

4. The method of claim 3 wherein the solvents used are heptane, benzene, and 2-methyltetrahydrofuran.

5. A method for evaluating an oil-reservoir system for secondary oil recovery, said method comprising:
   a. obtaining a core sample of the oil-reservoir system, and
   b. evaluating said core sample by the method of claim 1, thereby providing a data basis for determining the most effective secondary oil recovery method for the oil-reservoir system.

* * * * *